United States Patent
Myers et al.

(10) Patent No.: US 10,066,488 B2
(45) Date of Patent: Sep. 4, 2018

(54) TURBOMACHINE BLADE WITH GENERALLY RADIAL COOLING CONDUIT TO WHEEL SPACE

(71) Applicant: General Electric Company, Schenectady, NY (US)

(72) Inventors: Melbourne James Myers, Woodruff, SC (US); Camilo Andres Sampayo, Greer, SC (US); Xiuzhang James Zhang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 14/955,563

(22) Filed: Dec. 1, 2015

(65) Prior Publication Data
US 2017/0152752 A1 Jun. 1, 2017

(51) Int. Cl.
*F01D 5/18* (2006.01)
*F01D 5/14* (2006.01)
*F01D 5/08* (2006.01)

(52) U.S. Cl.
CPC .............. *F01D 5/187* (2013.01); *F01D 5/082* (2013.01); *F01D 5/147* (2013.01); *F05D 2240/304* (2013.01); *F05D 2240/80* (2013.01); *F05D 2260/20* (2013.01); *Y02T 50/676* (2013.01)

(58) Field of Classification Search
CPC .......... F01D 5/081; F01D 5/082; F01D 5/187; F01D 2240/80; F01D 2240/81; F01D 5/18
See application file for complete search history.

(56) References Cited

U.S. PATENT DOCUMENTS

| 2,931,623 A * | 4/1960 | Hyde | F01D 5/08 416/92 |
| 5,122,033 A * | 6/1992 | Paul | F01D 5/18 416/96 R |

(Continued)

FOREIGN PATENT DOCUMENTS

EP 1 496 199 A2 1/2005

OTHER PUBLICATIONS

European search opinion and European search report for European Patent Document 3176373 (European Patent Office) dated Mar. 28, 2017, PDF Documents [retrieved on Sep. 5, 2017]. Retrieved from Espacenet.*

(Continued)

*Primary Examiner* — Logan Kraft
*Assistant Examiner* — Brian Delrue
(74) *Attorney, Agent, or Firm* — Ernest G. Cusick; Hoffman Warnick LLC

(57) ABSTRACT

A turbomachine blade is disclosed including an airfoil including a cooling fluid plenum extending therein and a trailing edge cooling opening extending from the cooling fluid plenum through a trailing edge of the airfoil. A platform may couple the airfoil to a shank, the platform including a trailing edge extending downstream relative to the shank. At least one cooling conduit delivers a cooling fluid radially inward from at least one of the cooling fluid plenum and the trailing edge cooling opening to a wheel space that is adjacent the shank and radially inward from the trailing edge of the platform. A related turbomachine is also disclosed.

16 Claims, 5 Drawing Sheets

(56) References Cited

U.S. PATENT DOCUMENTS

| | | | | |
|---|---|---|---|---|
| 5,340,278 A * | 8/1994 | Magowan | | F01D 5/187 |
| | | | | 416/96 R |
| 6,017,189 A * | 1/2000 | Judet | | F01D 5/081 |
| | | | | 416/193 A |
| 6,390,775 B1 | 5/2002 | Paz | | |
| 6,416,284 B1 * | 7/2002 | Demers | | F01D 5/186 |
| | | | | 415/115 |
| 6,457,935 B1 * | 10/2002 | Antunes | | F01D 11/008 |
| | | | | 415/115 |
| 6,761,536 B1 | 7/2004 | Bash et al. | | |
| 6,945,749 B2 | 9/2005 | De Cardenas | | |
| 6,951,447 B2 | 10/2005 | Cherolis et al. | | |
| 7,121,797 B2 * | 10/2006 | Negulescu | | F01D 5/081 |
| | | | | 416/97 R |
| 7,186,089 B2 * | 3/2007 | Liang | | F01D 5/18 |
| | | | | 416/193 A |
| 7,819,629 B2 * | 10/2010 | Liang | | F01D 5/187 |
| | | | | 415/115 |
| 8,628,300 B2 * | 1/2014 | Boyer | | F01D 5/081 |
| | | | | 29/527.5 |
| 8,827,647 B1 * | 9/2014 | Liang | | F01D 5/187 |
| | | | | 416/97 R |
| 8,870,525 B2 * | 10/2014 | Walunj | | F01D 5/081 |
| | | | | 415/115 |
| 9,528,377 B2 * | 12/2016 | Fedor | | F01D 5/081 |
| 9,874,102 B2 * | 1/2018 | Azad | | F01D 5/187 |
| 2006/0127212 A1 | 6/2006 | Durocher et al. | | |
| 2010/0329888 A1 * | 12/2010 | Nadvit | | F01D 5/18 |
| | | | | 416/97 R |
| 2011/0229344 A1 * | 9/2011 | Johnson | | F01D 5/181 |
| | | | | 416/97 R |
| 2012/0082567 A1 * | 4/2012 | Tibbott | | F01D 5/186 |
| | | | | 416/97 R |
| 2013/0004331 A1 * | 1/2013 | Beeck | | F01D 5/143 |
| | | | | 416/97 R |
| 2014/0064984 A1 * | 3/2014 | Zhang | | F01D 5/187 |
| | | | | 416/97 R |
| 2015/0056073 A1 * | 2/2015 | Fedor | | F01D 5/081 |
| | | | | 416/1 |
| 2015/0075180 A1 * | 3/2015 | Zhang | | F01D 5/18 |
| | | | | 60/806 |
| 2015/0118045 A1 * | 4/2015 | Giametta | | F01D 5/18 |
| | | | | 416/1 |

OTHER PUBLICATIONS

Myers et al., Cooling passage for gas turbine system rotor blade, U.S. Appl. No. 15/163,061, filed May 24, 2016.

Extended European Search Report and Opinion issued in connection with corresponding EP Application No. 16199519.6 dated Mar. 28, 2017.

* cited by examiner

TURBOMACHINE BLADE WITH GENERALLY RADIAL COOLING CONDUIT TO WHEEL SPACE

BACKGROUND OF THE INVENTION

The disclosure relates generally to turbomachine blade cooling, and more particularly, to a turbomachine blade having generally radial cooling conduit delivering a cooling fluid radially inward to a wheel space adjacent the shank thereof and radially inward of a trailing edge of the platform.

A typical turbomachine blade includes an airfoil that is coupled by a platform to a shank which mounts the turbomachine blade to either a casing or rotor of the turbomachine. A trailing edge of the airfoil couples to a trailing edge of the platform of the blade where the two parts are coupled by a fillet, e.g., a generally triangular shaped piece of material formed by welding or other metal combining methods. Historically, a trailing edge of the airfoil has been radially aligned with an aft portion of the platform, referred to as a cover plate. In certain new turbomachine models, however, airfoils having trailing edges that meet the trailing edge of the platform in a radially un-aligned configuration are provided. This arrangement decreases the stress in the fillet region.

New turbomachine models are also operating under higher temperatures than previous models, and thus are exposing blades thereof as having less material capability. The increased temperatures can lead to a variety of life limiting issues such as low cycle fatigue (LCF). Consequently, the fillet region represents an area of increasing concern for low cycle fatigue as higher operating temperatures are employed. Conventionally, turbomachine blades that require cooling include a plenum therein for delivering cooling fluid that feeds the cooling fluid to hot areas. For example, axially extending cooling openings in communication with the plenum are typically applied in the trailing edge of the blade's airfoil. Cooling openings have also been provided axially through the platform or the cover plate. Cooling fluid that flows through the cooling openings cools the shank and/or the trailing edge of the platform that extends downstream relative to the airfoil. The fillet and the area below the radially innermost cooling hole, just above the platform, however are not providing with cooling openings and are not directly cooled.

BRIEF DESCRIPTION OF THE INVENTION

A first aspect of the disclosure provides a turbomachine blade, comprising: an airfoil including a cooling fluid plenum extending therein and a trailing edge cooling opening extending from the cooling fluid plenum through a trailing edge of the airfoil; a platform for coupling the airfoil to a shank, the platform including a trailing edge extending downstream relative to the shank; and at least one cooling conduit delivering a cooling fluid radially inward from at least one of the cooling fluid plenum and the trailing edge cooling opening to a wheel space that is adjacent the shank and radially inward from the trailing edge of the platform.

A second aspect of the disclosure provides a turbomachine, comprising: a rotor including a plurality of turbomachine blade, each turbomachine blade including: an airfoil including a cooling fluid plenum extending therein and a trailing edge cooling opening extending from the cooling fluid plenum through a trailing edge of the airfoil; a platform for coupling the airfoil to a shank, the platform including a trailing edge extending downstream relative to the shank; and at least one cooling conduit delivering a cooling fluid radially inward from at least one of the cooling fluid plenum and the trailing edge cooling opening to a wheel space that is adjacent the shank and radially inward from the trailing edge of the platform.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides radially oriented cooling conduits under the trailing edge of the platform section of a turbine blade.

Figure 1:
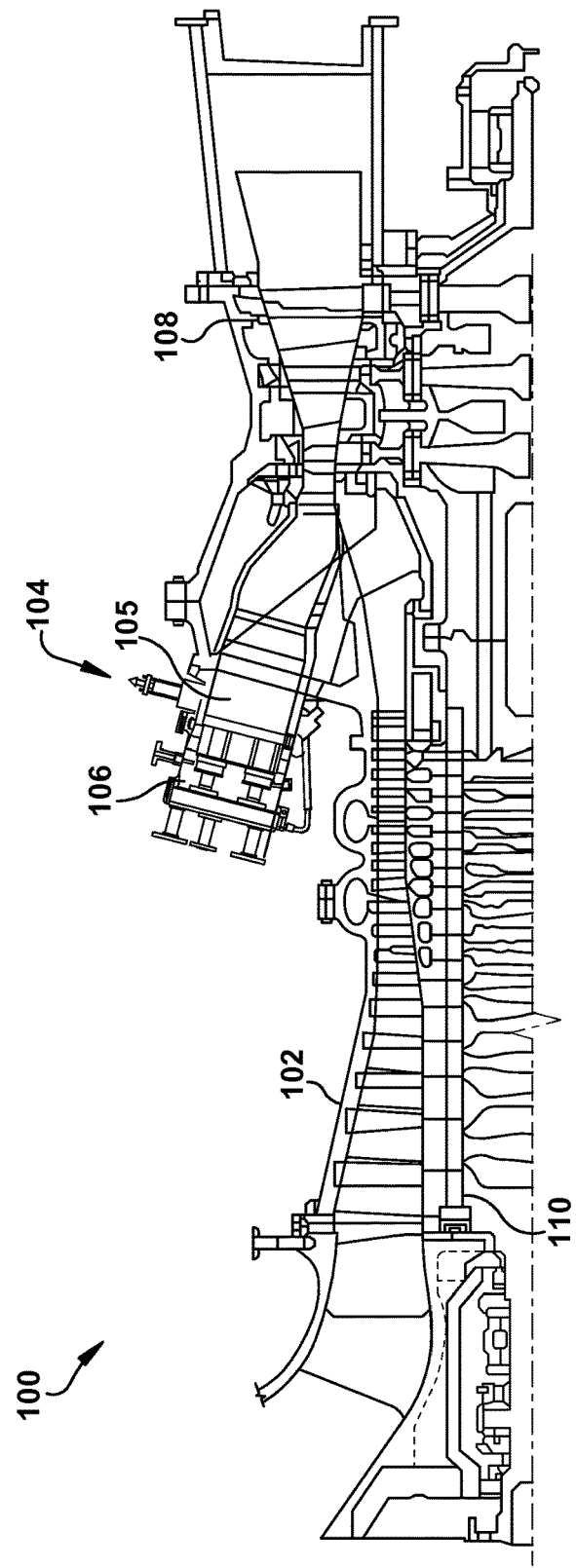
FIG. 1 is a schematic illustration of an exemplary combustion turbine engine.

FIG. 1 is a schematic illustration of an illustrative turbomachine in the form of a gas turbine system 100. System 100 includes a compressor 102 and a combustor 104. Combustor 104 includes a combustion region 105 and a fuel nozzle assembly 106. System 100 also includes a turbine 108 and a common compressor/turbine shaft 110 (sometimes referred to as rotor 110). In one embodiment, system 100 is a 7F model engine with an S1B tech package, commercially available from General Electric Company, Schenectady, N.Y. Embodiments of the disclosure are not limited to any one particular gas turbine engine, and may be implanted in connection with other engines including, for example, the 7FA and 9FA engine models of General Electric Company. Furthermore, teachings of the disclosure are not limited to gas turbines, and may be applied to any variety of turbomachine such as steam turbines, jet engines, compressors, etc. As used herein, the terms "axial", "radial" and "circumferential" are used with rotor 110 as the reference structure.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
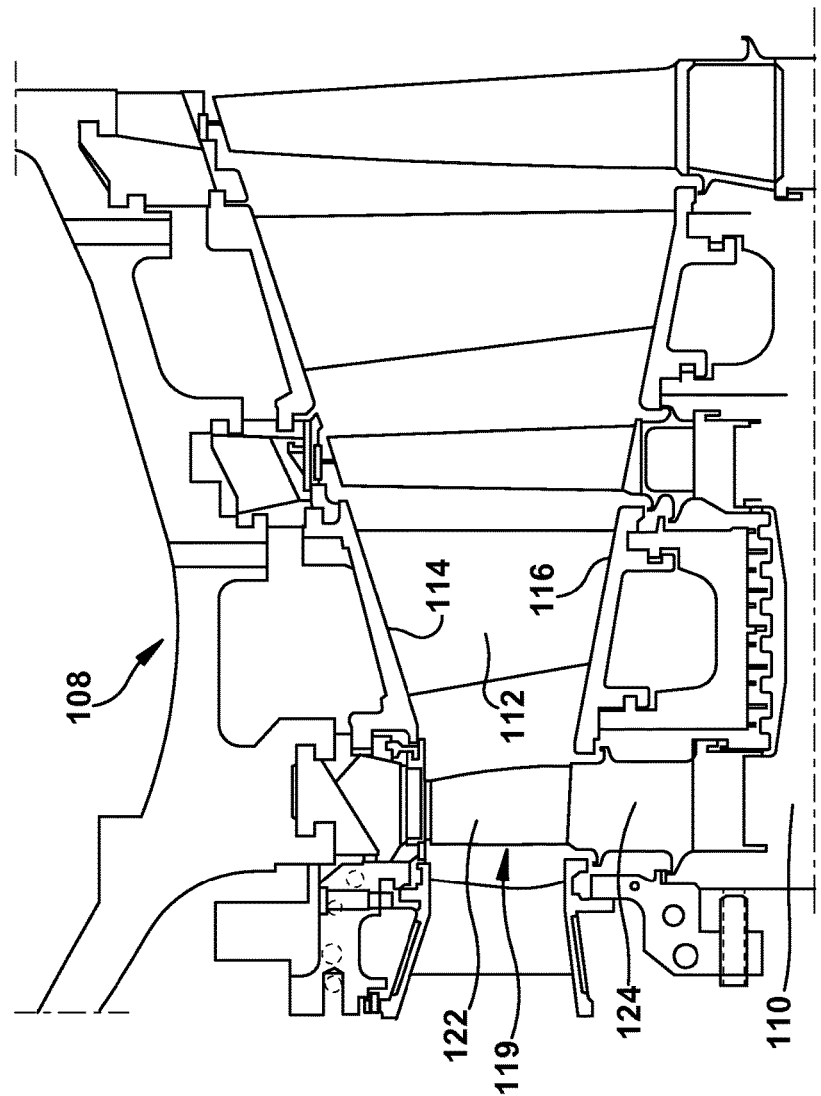
FIG. 2 is a cross-section illustration of an exemplary gas turbine assembly with a three stage nozzle that may be used with the combustion turbine engine in FIG. 1.

FIG. 2 is cross-section illustration of an illustrative turbine assembly 108 with a three stage nozzle that may be used with gas turbine system 100 in FIG. 1. Turbine assembly 108 includes a vane sub-assembly 112. Vane sub-assembly 112 is held in the turbine assembly 108 by a radially outer platform 114 and a radially inner platform 116. Turbine assembly 108 also includes a rotating blade 119, which may include an airfoil 122 held to rotor 110 by a shank 124. As the teachings of the disclosure may be applied to vanes/nozzles or rotating blades, vane sub-assembly 112 and rotating blade 119 shall be referred to collectively as a "turbomachine blade".

Figure 3:
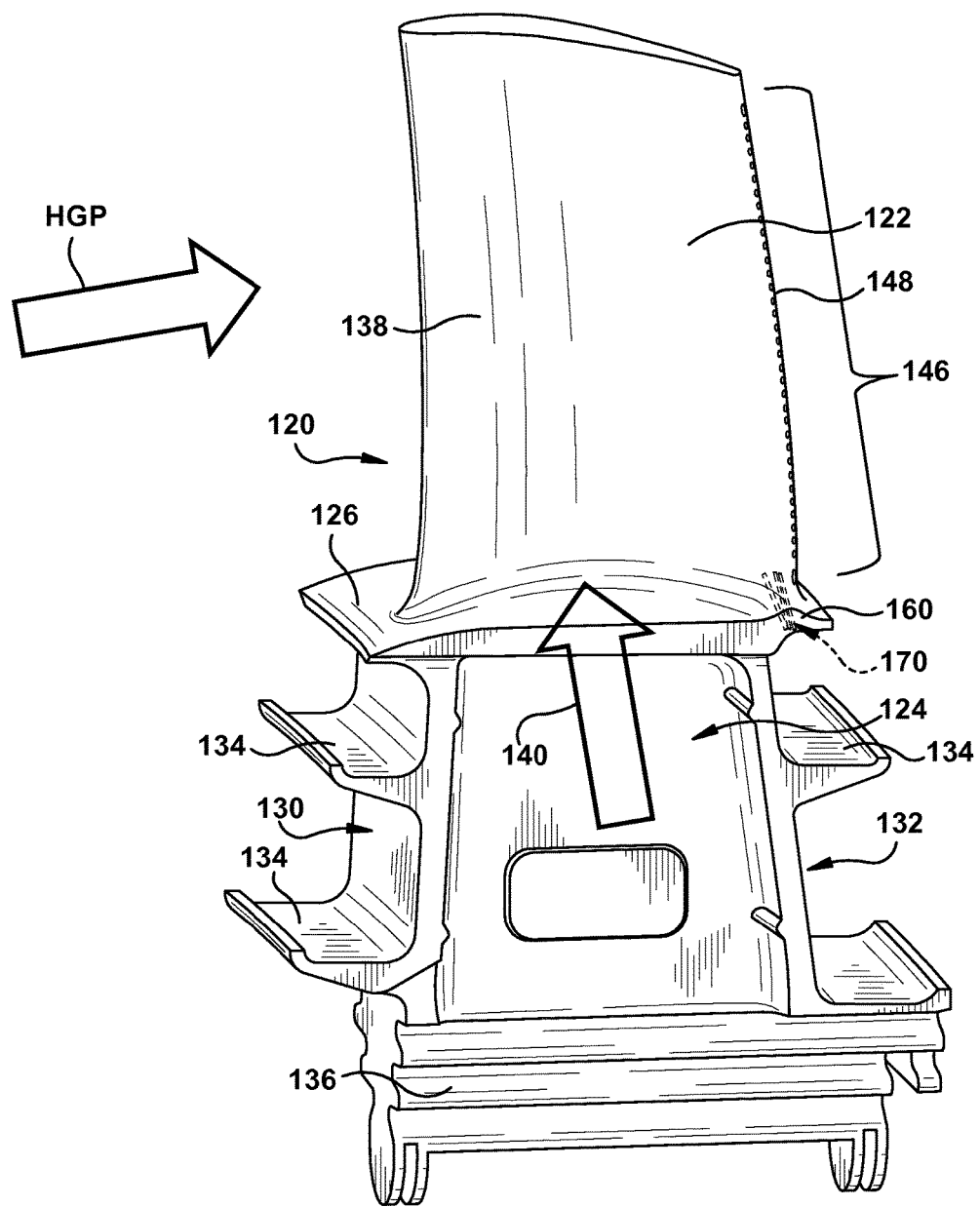
FIG. 3 shows a perspective view of a turbomachine blade including radially oriented cooling conduits according to embodiments of the disclosure.

FIG. 3 is a cross-sectional view of an illustrative turbomachine blade 120 (illustrated here as a rotating blade) according to embodiments of the disclosure. Turbomachine blade 120 may include airfoil 122 and shank 124. A platform 126 couples airfoil 122 to shank 124. Shank 124 may include a pair of opposing cover plates 130, 132. As indicated by hot gas path (HGP), cover plate 130 is an upstream side cover plate, facing towards HGP, and cover plate 132 is a downstream side cover plate, facing away from HGP. One or more angel wings 134 may extend from each cover plate 130, 132. Various forms of connection to either rotor 110 (FIGS. 1-2) or a casing of a turbomachine may be applied depending on how turbomachine blade 120 is employed. In FIG. 3 where the blade is a rotating blade, a connection tree 136 may be provided to couple turbomachine blade 120 to a rotor wheel (not shown). As illustrated, airfoil 122 includes a cooling fluid plenum 138 extending therein, which carries a cooling fluid 140 (arrow) to parts of blade 120. Cooling fluid 140 can be provided in any now known or later developed fashion, e.g., pulled from a compressor 102 stream, an exhaust steam flow, etc., depending on the amount of cooling desired and the type of turbomachine employed. In the example shown, cooling fluid plenum 138 encompasses a majority of an interior of airfoil 122. It is understood, however, that cooling fluid plenums 138 can take a variety of forms within airfoils such as but not limited to: serpentine paths, multiple chambers, etc. It is also understood that airfoil 122 may also optionally include a variety of different structures (not shown for clarity) to distribute cooling fluid 140 such as impingement sleeves, etc. Airfoil 120 also includes a plurality of trailing edge cooling openings 146 extending from cooling fluid plenum 138 through a trailing edge 148 of airfoil 122. In one embodiment, as illustrated, plurality of trailing edge cooling openings 146 are radially spaced along trailing edge 148 of airfoil 122. Equal radial spacing is not necessary in all cases. Cooling fluid 140 flows radially outward and then axially through trailing edge cooling openings 146 to cool airfoil 122. A radially innermost trailing edge cooling opening 150 is shown in FIGS. 4-5, and is so referenced as it is innermost relative to an axis of rotor 110 (FIGS. 1 and 2).

Figure 4:
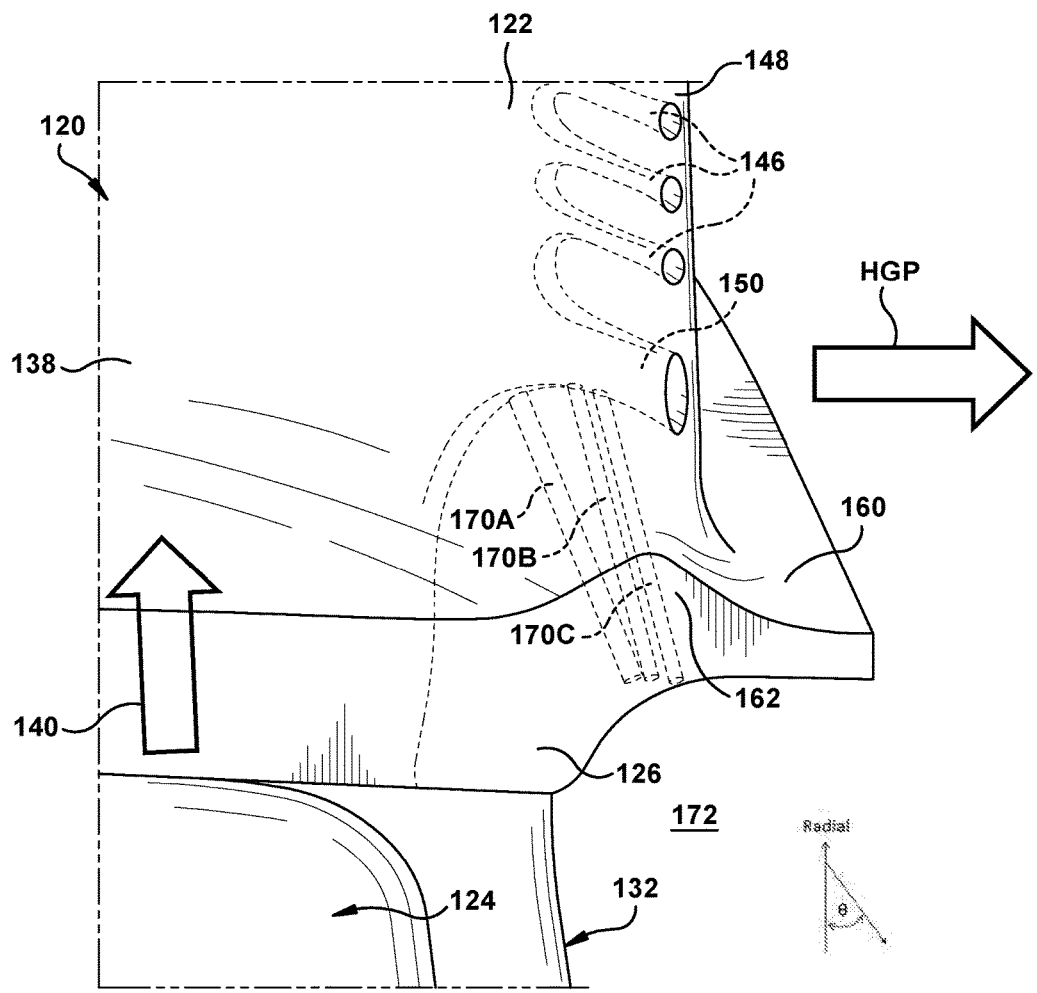
FIG. 4 shows an enlarged, transparent perspective view of a fillet region of a turbomachine blade and the radially oriented cooling conduits according to embodiments of the disclosure.
Figure 5:
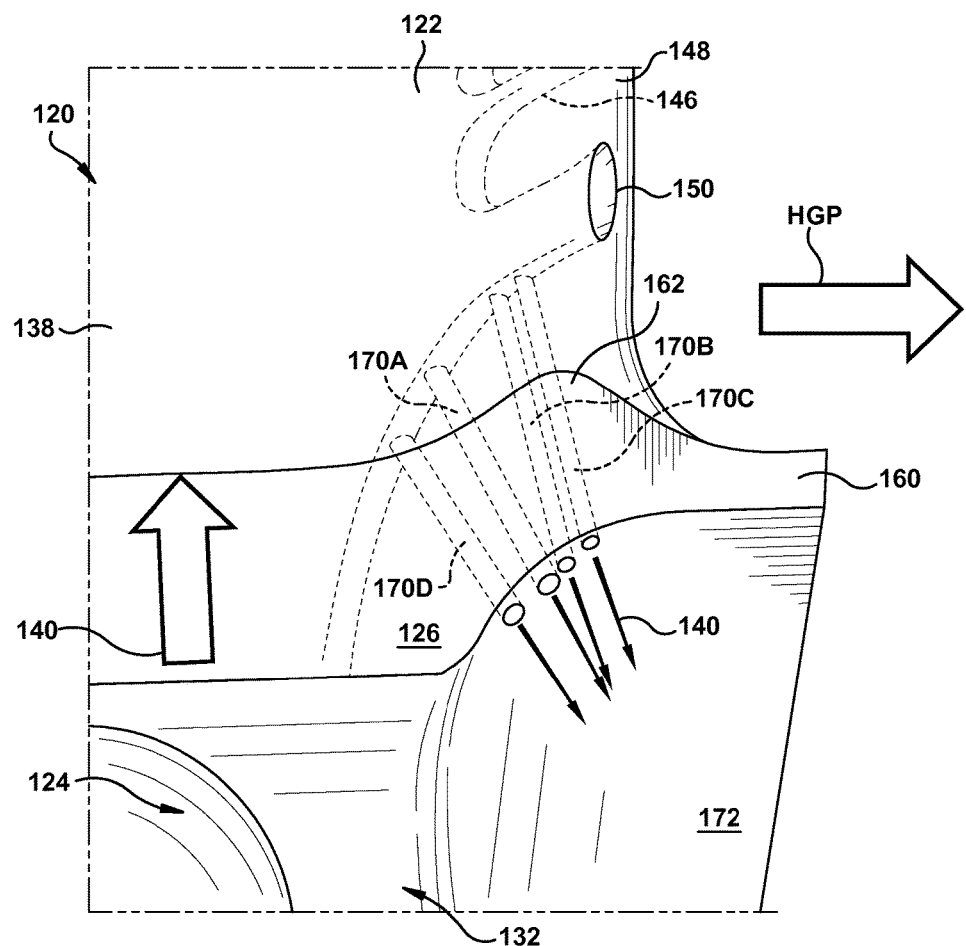
FIG. 5 shows a detailed, transparent perspective view of the fillet region of a turbomachine blade according to embodiments of the disclosure.

As shown best in the enlarged transparent perspective view of FIG. 4 and the enlarged, detailed transparent perspective view of FIG. 5, platform 126 includes a trailing edge 160, also referred to as a blade slash face, extending downstream relative to shank 124. In the example shown, airfoil 122 meets trailing edge of the platform 160 at a point downstream from trailing cover plate 132, i.e., trailing cover plate 132 is not radially aligned with trailing edge 148 of airfoil 122. Here, a fillet 162 that couples trailing edge of the platform 160 to airfoil 122 is exposed to a high stress relative to blades where the airfoil and trailing cover plate 132 are radially aligned. "Fillet" 162 may include any manner of additional material added between airfoil 122 and platform 126 to couple the two parts together, e.g., a weld fillet. Radially innermost trailing edge cooling opening 150 is shown having a slightly larger radial extent compared to other trailing edge cooling openings 146 because, historically, more cooling fluid 140 is desirable to cool fillet 162. However, all of the openings 146, 150 may have the same dimensions.

In order to provide cooling to fillet 162 in addition to trailing edge of the platform 160 compared to conventional arrangements, at least one cooling conduit 170 delivers cooling fluid 140 radially inward (relative to an axis of rotor 110) from cooling fluid plenum 138 and/or trailing edge cooling opening 150 to a wheel space 172 that is adjacent shank 124 and radially inward from trailing edge of the platform 160. In the embodiment shown in FIG. 4, three cooling conduits 170A, 170B, 170C are provided. In FIG. 4, one cooling conduit 170A extends from cooling fluid plenum 138 and two cooling conduits 170B, 170C extend from trailing edge cooling opening 150. The (radially innermost) trailing edge cooling opening 150 may be considered to begin at a point where cooling fluid 140 can no longer pass anywhere else other than through opening 150 and exit airfoil 122. In another embodiment, shown in FIG. 5, two cooling conduits 170A, 170D extend from cooling fluid plenum 138 and two cooling conduits 170B, 170C extend from trailing edge cooling opening 150. Although two examples of cooling conduit 170 arrangements have been illustrated, it is emphasized that any number or arrangement of cooling conduits from cooling fluid plenum 138 and/or trailing edge cooling opening 150 may be employed. In any event, at least one cooling conduit, e.g., 170B, 170C, extends through trailing edge of the platform 160 to provide improved cooling to each. Each cooling conduit 170 may be formed through platform 126, etc., in any now known or later developed manner, e.g., rotating bit drilling, fast hole electro-discharge machining (EDM) drilling, etc. Cooling fluid plenum 138 and/or trailing edge cooling opening 150 each have a circumferential dimension (generally into and out of page) sufficient for a respective cooling conduit 170 to "land" thereon, i.e., open into the respective area without cutting significantly into a radial extent thereof. As the circumferential dimensions of plenum 138 and opening 150 may vary across different turbomachines, so too may the diameter of cooling conduits 170. Although cooling conduits 170 within a particular blade may be the same size that need not be the case.

As used herein, cooling conduits 170 have been described as "radially oriented" because they generally extend in a radial direction within platform 126, etc. For example, each cooling conduit 170 may extend at an angle relative to radial (relative to rotor 110 axis (FIGS. 1-2)) between approximately 0° to approximately 45'; "approximately" indicating +/−0.5°. In one embodiment, the angle may be approximately 30°. While cooling conduits 170 have been illustrated as fairly straight, they may curve to some degree. In addition, one or more of cooling conduits 170 may be parallel to one another (e.g., conduits 170B, 170C), or one or more or all of them may be non-parallel (e.g., conduits 170A, 170B).

Embodiments of the disclosure provide cooling fluid 140 flow in a radially inward direction (see arrows in FIG. 5) to wheel space 172 and in so doing provide improved cooling of fillet 162 and/or trailing edge of the platform 160 compared to conventional cooling arrangements. Consequently, cooling conduits 170 allow cooling of high stress areas very close to trailing edge 148, which reduces issues stress and low cycle fatigue, and saves on cooling flow which increases overall turbomachine performance. Furthermore, cooling conduits 170 allow for additional cooling without changing existing blade castings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbomachine blade, comprising:
an airfoil including a cooling fluid plenum extending therein and a trailing edge cooling opening extending from the cooling fluid plenum through a trailing edge of the airfoil;
a platform for coupling the airfoil to a shank, the platform including a trailing edge extending downstream relative to the shank;
a connection tree coupled to a radially inward end of the shank; and
at least two cooling conduits delivering a cooling fluid radially inward from at least one of the cooling fluid plenum and the trailing edge cooling opening to a wheel space that is adjacent the shank and radially inward from the trailing edge of the platform and radially outward from the connection tree, wherein a respective outlet of each of the at least two cooling conduits is radially inward from a respective inlet of each of the at least two cooling conduits, and wherein at least one of the at least two cooling conduits extends from the cooling fluid plenum to the wheel space and at least one of the at least two cooling conduits extends from the trailing edge cooling opening to the wheel space.

2. The turbomachine blade of claim 1, wherein the at least two cooling conduits are fairly straight.

3. The turbomachine blade of claim 2, wherein at least one cooling conduit extends from the cooling fluid plenum to the wheel space and at least two cooling conduits extend from the trailing edge cooling opening to the wheel space.

4. The turbomachine blade of claim 3, wherein the trailing edge cooling opening is a radially innermost cooling opening of a plurality of trailing edge cooling openings radially spaced along the trailing edge of the airfoil.

5. The turbomachine blade of claim 2, wherein the trailing edge cooling opening is a radially innermost cooling opening of a plurality of trailing edge cooling openings radially spaced along the trailing edge of the airfoil.

6. The turbomachine blade of claim 1, wherein each cooling conduit extends at an angle relative to radial between approximately 0° to approximately 45°.

7. The turbomachine blade of claim 1, wherein the airfoil is coupled to the trailing edge of the platform by a fillet, and wherein the at least two cooling conduits extend through the trailing edge of the platform.

8. The turbomachine blade of claim 1, wherein the trailing edge cooling opening is a radially innermost cooling opening of a plurality of trailing edge cooling openings radially spaced along the trailing edge of the airfoil.

9. A turbomachine, comprising:
a rotor including a plurality of turbomachine blades, each turbomachine blade including:
an airfoil including a cooling fluid plenum extending therein and a trailing edge cooling opening extending from the cooling fluid plenum through a trailing edge of the airfoil;
a platform for coupling the airfoil to a shank, the platform including a trailing edge extending downstream relative to the shank;
a connection tree coupled to a radially inward end of the shank; and
at least two cooling conduits delivering a cooling fluid radially inward from at least one of the cooling fluid plenum and the trailing edge cooling opening to a wheel space that is adjacent the shank and radially inward from the trailing edge of the platform and radially outward from the connection tree, wherein a respective outlet of each of the at least two cooling conduits is radially inward from a respective inlet of each of the at least two cooling conduits, and wherein at least one of the at least two cooling conduits extends from the cooling fluid plenum to the wheel space and at least one of the at least two cooling conduits extends from the trailing edge cooling opening to the wheel space.

10. The turbomachine of claim 9, wherein the at least two cooling conduits are fairly straight.

11. The turbomachine of claim 10, wherein one cooling conduit extends from the cooling fluid plenum and two cooling conduits extend from the trailing edge cooling opening.

12. The turbomachine of claim 11, wherein the trailing edge cooling opening is a radially innermost cooling opening of a plurality of trailing edge cooling openings radially spaced along the trailing edge of the airfoil.

13. The turbomachine of claim 10, wherein each cooling conduit extends at an angle relative to radial between approximately 0° to approximately 45°.

14. The turbomachine of claim 10, wherein the trailing edge cooling opening is a radially innermost cooling opening of a plurality of trailing edge cooling openings radially spaced along the trailing edge of the airfoil.

15. The turbomachine of claim 9, wherein the airfoil is coupled to the trailing edge of the platform by a fillet, and wherein the at least two cooling conduits extend through the trailing edge of the platform.

16. The turbomachine of claim 9, wherein the trailing edge cooling opening is a radially innermost cooling opening of a plurality of trailing edge cooling openings radially spaced along the trailing edge of the airfoil.

* * * * *